United States Patent [19]

Isono et al.

[11] Patent Number: 4,592,588
[45] Date of Patent: Jun. 3, 1986

[54] VEHICLE SEAT

[75] Inventors: Hiroyuki Isono; Mutsuo Kurosawa, both of Tokyo, Japan

[73] Assignee: Tachikawa Spring Co., Ltd., Tokyo, Japan

[21] Appl. No.: 520,445

[22] Filed: Aug. 4, 1983

[51] Int. Cl.$^4$ ............................................. A47C 3/00
[52] U.S. Cl. ............................ 297/284; 297/DIG. 3; 297/460
[58] Field of Search ................ 297/284, DIG. 3, 458, 297/459, 460

[56] References Cited

U.S. PATENT DOCUMENTS

| | | | |
|---|---|---|---|
| 3,326,601 | 6/1967 | Vanderbilt et al. | 297/DIG. 3 |
| 3,363,941 | 1/1968 | Wierwille | 297/284 |
| 3,983,640 | 10/1976 | Cardullo et al. | 297/284 |
| 4,017,118 | 4/1977 | Cawley | 297/284 |
| 4,067,078 | 1/1978 | Winston | 297/284 |
| 4,190,286 | 2/1980 | Bentley | 297/284 |
| 4,321,044 | 3/1982 | Kron | 297/284 |
| 4,444,430 | 4/1984 | Yoshida et al. | 297/DIG. 3 |

FOREIGN PATENT DOCUMENTS 58-53524  3/1983  Japan ............................ 297/DIG. 3

Primary Examiner—Francis K. Zugel
Attorney, Agent, or Firm—Cushman Darby & Cushman

[57] ABSTRACT

A vehicle seat is disclosed in which an air bag is inserted into each of a plurality of support sections provided in a seat cushion and a seat bag respectively, and feed/exhaust operating devices provided collectively at one place are operated to adjust the amount of air within each of the air bags separately or simultaneously so as to expand and thus elevate the front part of the respective support sections by means of air pressure.

2 Claims, 8 Drawing Figures

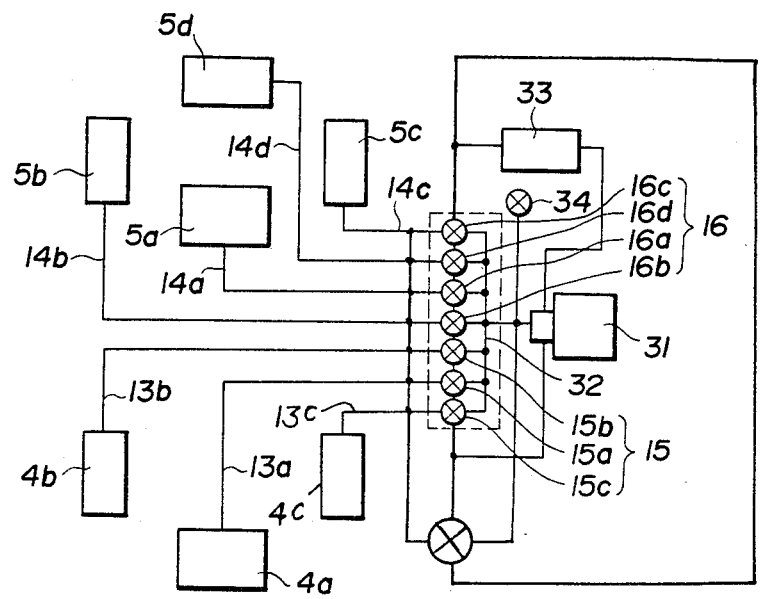
FIG. 6
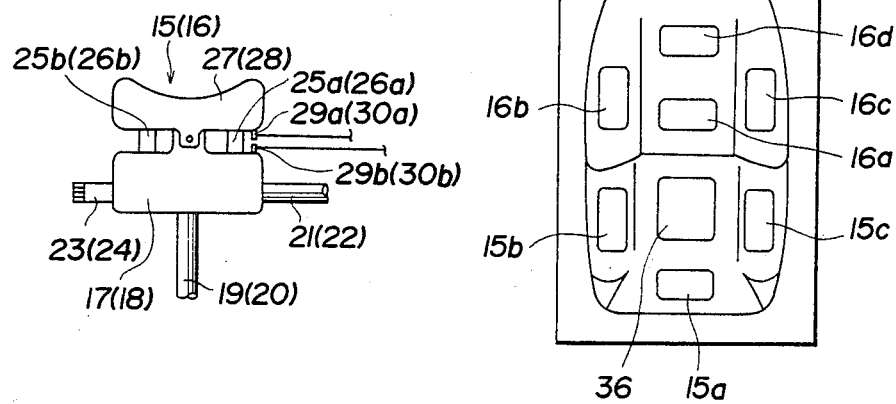
FIG. 7
FIG. 8

VEHICLE SEAT

TECHNICAL FIELD OF THE INVENTION

The present invention relates to vehicle seats, and more particularly, to automobile seats wherein the height and shape of inflatable support sections provided at the desired portions in a seat cushion and a seat back can be variably adjusted by means of air pressure so as to conform the body of a user thereby improving the user's comfort.

BACKGROUND

Some of the conventional seat cushions and seat backs for vehicle seats are arranged such that they are elevated at the desired portions thereof and the height of such elevation can be adjusted for improving their ability to hold the body of a user and for relieving discomfort. More particularly, such seat cushions each are provided with a thigh support section and two side support sections, while such seat backs each are provided with a lumbar support section, two side support sections and a shoulder support section. Each of these support sections has an actuating mechanism of a mechanical structure. For this reasons, each support section is complicated in structure and requires relatively more components, resulting in relatively more time and labor for assembly thereby increasing costs. Also, in the prior art there are arranged separate operating devices for the respective support section actuating mechanisms in respective positions adjacent to the corresponding actuating mechanisms, and thus they occupy different operating positions from each other, which results in rather poor operability.

Accordingly, the purpose of the present invention is to provide a vehicle seat in which air bags are incorporated one in each of the support sections of a seat cushion and a seat bag, and feed/exhaust operating devices for the respective air bags are provided collectively at one point such that they can be operated separately or simultaneously to adjust the amount of air existing within each of the air bags, whereby each of the support sections can be arranged to be inflatable by air pressure.

Upon further study of the specification and appended claims, further objects, features and advantages of the present invention will become more fully apparent to those skilled in the art to which the invention pertains.

BRIEF SUMMARY OF THE INVENTION

In brief, the above and other objects, features and advantages of the present invention are attained in the following manner:

An air bag is inserted into each of a plurality of support sections provided in a seat cushion and a seat back respectively. The feed/exhaust operating devices are provided in a batch at one place and are operable to adjust the amount of air within each of the air bags separately or simultaneously so as to expand and thus elevate the front part of the respective support sections by means of air pressure. Thus, since the support sections of the present invention are arranged such that they can be adjusted in an inflatable/deflatable manner using air pressure without resort to the mechanical mechanisms as in the prior art, better support feeling adapted to the physique and individual comfort of a user can be easily obtained. Also, the elasticity secured by air pressure can provide a very fine touch, thereby improving the performance of the vehicle seat in holding the body of the user providing the user with a comfortable seat and relieving the feeling of tiredness during a fairly long seating. Further, the collective installation of the feed/exhaust operating devices for the respective air bags at one point enables each of the air bags to enhance its feeding and exhausting performance. In addition, since no metal members are used for the seat support sections it is unnecessary to machine the frame sides, thereby resulting in a simple structure which simplifies its assembly and also reduces the total weight of the vehicle seat.

BRIEF DESCRIPTION OF THE DRAWINGS

The above and other objects, features and advantages of the present invention will be more fully apparent to those of ordinary skill in the art to which this invention pertains from the following detailed description when considered in connection with the accompanying drawings, in which like reference characters designate like or corresponding parts throughout the several views and wherein:

FIG. 6 is a distribution diagram of air feed lines for each of said air bag;

FIG. 7 is a side elevation of a valve switch; and

FIG. 8 is a front elevation of said valve switch and a unit box.

DETAILED DESCRIPTION OF THE INVENTION

Figure 1:
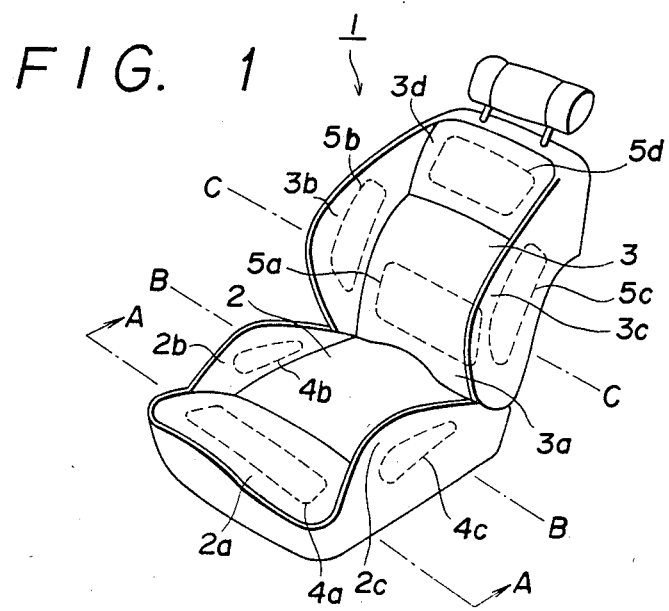
FIG. 1 is a perspective view of an embodiment of a vehicle seat according to the present invention.

FIG. 1 illustrates a vehicle seat (1) comprising a seat cushion (2) and a seat bag (3) which include a plurality of support sections respectively. In particular, the seat cushion (2) includes a thigh support section (2a) at its front portion and two side support sections (2b),(2c) at its both side portions in which air bags (4), or, ((4a),(4b), (4c)) are incorporated respectively, while seat back (3) includes a lumbar support section (3a) at its lower center portion, two side support sections (3b)(3c) at both its side portions and a shoulder support section (3d) at its upper center portion, in which air bags (5), or ((5a)(5b),(5c)) are incorporated, respectively.

Figure 2:
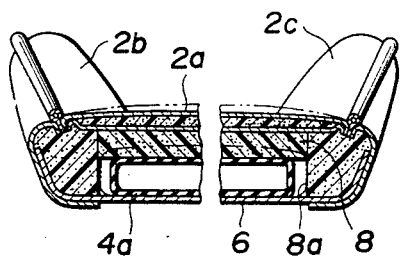
FIG. 2 is a partially omitted section view taken on line A—A in FIG. 1.
Figure 3:
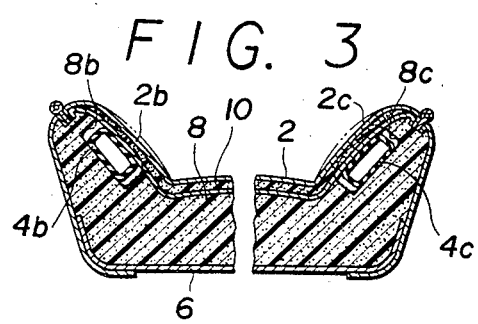
FIG. 3 is a similarly partially omitted section view taken on line B—B.
Figure 4:
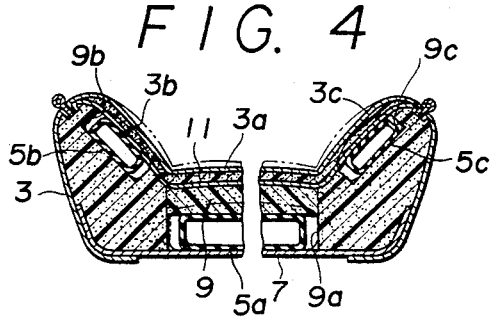
FIG. 4 is a further similarly partially omitted section view taken on line C—C.

In detail, as shown in FIGS. 2, 3 and 4, air bags (4a) and (5a),(5d) to be contained in the thigh support section (2a) of the seat cushion (2) and the lumbar support section (3a), the shoulder support section (3d) of the seat back (3), respectively, are incorporated between seat frames (6),(7) and seat pads (8),(9) by forming recesses (8a) and (9a) at the back parts of the seat pads (8) and (9). Air bags (4b), (4c) and (5b),(5c) to be contained in said side support sections (2b),(2c) and (3b),(3c), respectively, are inserted between the seat pads (8),(9) and top layers (10),(11) by forming recesses (8b),(8c) and (9b),(9c) at the front parts of said seat pads (8) and (9).

Figure 5:
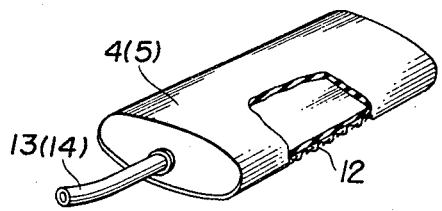
FIG. 5 is partially cut-away perspective view of an embodiment of an air bag of the present invention.

FIG. 5 illustrates air bags (4),(5) each of which comprises a bag-shaped front or outer part formed of a stretchable material such as rubber, with a rear part of a non-stretchable material (12) such as canvas being connected to the front part, and thus the air bags are arranged to be stretchable only at the outer portion thereof. Each of the air bags (4),(5) is connected with vent pipes (13) or ((13a),(13b), (13c)) and (14) or ((14a),(14b),(14c),(14d)), respectively, and the leading ends of the pipes are connected with valve switches (15) or ((15a),(15b),(15c)) and (16) or ((16a),(16b), (16c),(16d)), respectively.

Valve switches (15),(16), as shown in FIG. 7, are arranged such that air pipes (19),(20) are connected via switch valves (not shown) and check valves (not shown) with air feed pipes (21),(22), and exhaust pipes (23),(24) within their main bodies (17),(18), respectively, such that operating projections (25a),(25b) and (26a),(26b) which project from the main bodies (17),(18) can be pressed and be operated alternately by operators (27),(28). contacts (29a),(29b) and (30a),(30b) project from positions adjacent to the operating projections (25a),(26a) for operating the switch valve at the air feed pipes (21),(22) side and are arranged so as to be in opposing relationship relative to the main bodies (17),(18) and the operators (27), (28), respectively.

The air pipes (19),(20) of the valve switches (15),(16) are connected with vent pipes (13),(14), of the air bags (4),(5), respectively, and the feed pipes (21),(22) each are connected with a branched, connection pipe from an air supply pump (31). On the one hand, the contacts (29a), (30a) are connected to the air supply pump (31) and on the other hand the contacts (29b),(30b) are connected to a power source (33), respectively. The base portion of the connection pipe (32) is connected with a safety valve (34) so as to prevent each of the air bags (4),(5) from overcharging air.

Valve switches (15),(16) can be provided in a batch at a suitable place within the seat (1) or in a console box (35). In this case, as shown in FIG. 8, if the valve switches (15), (16) are provided in a manner to correspond to the positional condition of the air bags (4),(5), respectively, then the operational condition of said valve switches can be observed visually. Alternatively, an operation station may be set up from which both of the valve switches (15),(16) can be actuated simultaneously.

The operation of the embodiment arranged in the manner mentioned above will now be described. When the operator means (27),(28) of the valve switches (15),(16) are pushed in one direction, the operating projections (25a),(26a) are forced to enter the main bodies (17),(18), respectively, to open the switch valves (not shown) of the air feed pipes (21),(22) so that the air feed pipes are brought into communication with the air pipes (19),(20), respectively, and at the same time the contacts (29a),(29b) and (30a),(30b) are brought into contact with each other respectively, so that the air supply pump (31) is electrically energized from the power source (33) and thus is actuated. Consequently, air will be supplied from the air feed pipes (21),(22) via the air pipes (19),(20) and the vent pipes (13),(14) to the air bags (4),(5), which will be then expanded so as to push the support sections (2a),(2b),(2c) and (3a),(3b),(3c) of the seat cushion (2) and seat bag (3) respectively toward the respective front directions. Once such an inflated condition has been accomplished, if the user's hold of the operator means (27),(28) of the valve switch (15),(16) is released, the contacts (29a),(29b) and (30a),(30b) are then separated away from each other, respectively, which causes the pump (31) to stop and also the operating projections (25a),(26a) to return to their respective original positions from their displaces positions. As a result, the switch valves of the air feed pipes (21),(22) are closed. In this manner, the air bags (4),(5) can be maintained in their desired inflated conditions.

While such an inflated condition is being maintained, if the operator means (27),(28) of the valve switches (15),(16) are pushed in a direction opposite to that described above, then the operating projections (25b),(26b) are forced into the main bodies (17),(18) to open the switch valves (not shown) of the exhaust pipes (23),(24), respectively, such that the exhaust pipes (23),(24) communicate with the air pipes (19),(20). Consequently, air present within the air bags (4),(5) is exhausted via the vent pipes (13),(14) and air pipes (19),(20) through the exhaust pipes (23),(24). During the exhausting operation, the air existing within the air bags (4),(5) is prevented from flowing toward the air feed pipes (21),(22) due to the action of check valves (not shown), and all of the air will be exhausted through the exhaust pipes (23),(24), so that the air bags (4),(5) are deflated and thus the elevated support sections are lowered in height accordingly.

Also, in the above-described operation, each of the air bags (4a),(4b),-----, and (5a),(5b),-----can be separately inflated and deflated as necessary, independently of other bags, by operating each of the valve switches (15a),(15b), -----, and (16a),(16b), ----- individually, and thus any one or more support sections can be adjusted in its or their projection or elevation level(s) as required.

In this manner, the supports sections (2a),(2b),(2c) and (3a),(3b),(3c),(3d) of the respective seat cushion (2) and seat bag (3) can be adjusted by means of air pressure in their projection height and thus it is possible to change their feeling in holding the user.

Although in the embodiment disclosed the air bags (4),(5), are arranged to be contained within the seat pads (8), (9) by forming recessed portions therein, they may be inserted and interposed directly between the seat pads (8),(9) and the top layers (10),(11) in the respective support sections, or the air bags (4),(5) can be covered only at the front surfaces of the top layers (10),(11) with a cover made of the same material as the top layers.

In the above-described embodiment, each of the air bags (4),(5) is formed by superposing and connecting a front part of a stretchable material and a rear part of canvas—non-stretchable material—with each other to form an integral unit, so that only the front part can be inflated and the rear part must be non-stretchable. However, when the surface on which the air bags (4),(5) are disposed is provided in the form of a rigid surface, the rear parts of the air bags (4),(5) each will be prevented against inflation, and, for this reason, it is not necessary to form the rear parts of non-stretchable materials.

Moreover, it is also possible to provide a circuit which permits a simultaneous feed and exhaust operation for all air bags (4),(5) and to arrange one valve switch (36) for operating this circuit at the center of the position where the valve switches (15),(16) are located.

Thus, according to the invention, since the support sections located at the required portions of the seat cushion and the seat bags are arranged such that the adjustment of their inflation and deflation can be made by means of air pressure without using any mechanical mechanisms, a feeling of holding fit for the physique and taste of a seater can be easily obtained, and at the same time the proper elasticity due to the air pressure provides a very fine touch. In other words, not only the holdability of the seat for the seater is improved, but also the seating feeling becomes more comfortable, which relieves the feeling of tiredness even in a long time seating.

Also, the operationability of each of the support sections can be enhanced since the support sections can be adjusted collectively at one place. Further, in arrangement of the support sections, no metal members are used and the frame sides of the support sections are little necessary to be treated, so that a simple structure is realized for simplification of assembling operation and the reduction of the total weight of the seat is also obtained.

What is claimed is:

1. A vehicle seat comprising:
   (a) a seat cushion having a thigh support section defined therein and a pair of side support sections formed at respective lateral portions thereof;
   (b) a seat back having a lumbar support section and a shoulder support section defined thereon, and having a pair of side support section formed at respective lateral portions thereof;
   (c) a first inflatable air bag incorporated within said thigh support section of said seat cushion;
   (d) a second inflatable air bag incorporated within one of said pair of side support sections of said seat cushion;
   (e) a third inflatable air bag incorporated within the other of said pair of side support sections of said seat cushion;
   (f) a fourth inflatable air bag incorporated within said lumbar support section of said seat back;
   (g) a fifth inflatable air bag incorporated within said shoulder support section of said seat back;
   (h) a sixth inflatable air bag incorporated within one of said side support sections of said seat back;
   (i) a seventh inflatable air bag incorporated within the other of said side support sections of said seat back;
   (j) air source means for providing a source of pressurized air;
   (k) pipe system means for establishing fluid communication between said air source means and each of said first to seventh inflatable air bags, inclusive;
   (l) plural valve means each connected between said pipe system means and a respective one of said first to seventh inflatable air bags for permitting feed and exhaustion of said pressurized air into and out of said first to seventh inflatable air bags, respectively; and
   (m) control means for collectively controlling the operation of said plural valve means at a common location, said control means including:
      a console board on which a diagram of the vehicle seat is illustrated, thereby providing a diagrammatic view of the cushion seat and seat back and diagrammatically showing the thigh support section, the lumbar support section, the shoulder support section and the left and right side support sections of each of said cushion seat and seat back; and
      plural switch means arranged on said console board such that they are each respectively positioned at corresponding one of said support sections shown in said diagram of the vehicle seat, said plural switch means including:
         first switch means arranged on said thigh support section shown in said diagram of the vehicle seat for causing one of said valve means corresponding thereto to operate so as to effect the inflation and deflation of said first inflatable air bag, thereby to inflate or deflate said thigh support section of said seat cushion;
         second switch means arranged on said left side support section shown in said diagram of the vehicle seat for causing one of said valve means corresponding thereto to operate so as to effect the inflation and deflation of said second inflatable air bag, thereby to inflate or deflate said left side support section of said seat cushion;
         third switch means arranged on said right side support section shown in said diagram of the vehicle seat for causing one of said valve means corresponding thereto to operate so as to effect the inflation and deflation of said third inflatable air bag, thereby to inflate or deflate said right side support section of said seat cushion;
         fourth switch means arranged on said lumbar support section shown in said diagram of the vehicle seat for causing one of said valve means corresponding thereto to operate so as to effect the inflation and deflation of said forth inflatable air bag, thereby to inflate or deflate said lumbar support section of said seat back;
         fifth switch means arranged on said shoulder support section shown in said diagram of the vehicle seat for causing one of said valve means corresponding thereto to operate so as to effect the inflation and deflation of said fifth inflatable air bag, thereby to inflate or deflate said shoulder support section of said seat back;
         sixth switch means arranged on said left side support section shown in said diagram of the vehicle seat for causing one of said valve means corresponding thereto to operate so as to effect the inflation and deflation of said sixth inflatable air bag, thereby to inflate or deflate said left side support section of said seat back; and
         seventh switch means arranged on said right side support section shown in said diagram of the vehicle seat for causing one of said valve means corresponding thereto to operate so as to effect the inflation and deflation of said seventh inflatable air bag, thereby to inflate or deflate said right side support section of said seat back.

2. The vehicle seat according to claim 1 wherein said control means further includes common switch means arranged on the central portion of said cushion seat shown in said diagram of the vehicle seat, said common switch means being adapted to cause all of said valve means to operate so as to effect the inflation and deflation of all said first to seventh inflatable air bags at the same time, thereby to inflate or deflate all said support sections of said cushion seat and seat back simultaneously.

* * * * *